(12) United States Patent
Onishi

(10) Patent No.: US 9,884,659 B2
(45) Date of Patent: Feb. 6, 2018

(54) VEHICLE LOWER SECTION STRUCTURE

(71) Applicant: TOYOTA JIDOSHA KABUSHIKI KAISHA, Toyota-shi (JP)

(72) Inventor: Yoichiro Onishi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/264,874

(22) Filed: Sep. 14, 2016

(65) Prior Publication Data

US 2017/0120959 A1 May 4, 2017

(30) Foreign Application Priority Data

Oct. 30, 2015 (JP) ................................ 2015-215020

(51) Int. Cl.
| | | |
|---|---|---|
| *B60N 99/00* | (2006.01) | |
| *B62D 25/20* | (2006.01) | |
| *B62D 21/03* | (2006.01) | |
| *B62D 25/04* | (2006.01) | |

(52) U.S. Cl.
CPC ......... *B62D 25/2036* (2013.01); *B62D 21/03* (2013.01); *B62D 25/04* (2013.01)

(58) Field of Classification Search
CPC ..... B62D 25/2036; B62D 21/03; B62D 25/04
See application file for complete search history.

(56) References Cited

U.S. PATENT DOCUMENTS

| | | | | |
|---|---|---|---|---|
| 7,862,108 B2* | 1/2011 | Tamakoshi | ............. | B62D 25/04 296/203.02 |
| 9,238,485 B2* | 1/2016 | Atsumi | | |
| 2010/0231002 A1* | 9/2010 | Yoshioka | ............. | B62D 21/157 296/187.12 |
| 2010/0237659 A1 | 9/2010 | Ishigame et al. | | |
| 2011/0210582 A1 | 9/2011 | Mori | | |

FOREIGN PATENT DOCUMENTS

| | | |
|---|---|---|
| JP | 2010-120404 | 6/2010 |
| JP | 2010-228482 | 10/2010 |

\* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle lower section structure including: rockers; a floor tunnel; and a floor cross member that extends along the vehicle width direction and couples the rocker and the floor tunnel together, that includes an upper wall, a front wall extending downward from a front end portion of the upper wall, and a rear wall extending downward from a rear end portion of the upper wall that together with the floor panel configure a closed cross-section, wherein of the front wall and the rear wall, a first cutout portion is formed in a lower edge of an end portion at the rocker side of the wall further from a center pillar, and a second cutout portion that is smaller than the first cutout portion is formed in a lower edge of an end portion at the rocker side of the wall closer to the center pillar.

8 Claims, 5 Drawing Sheets

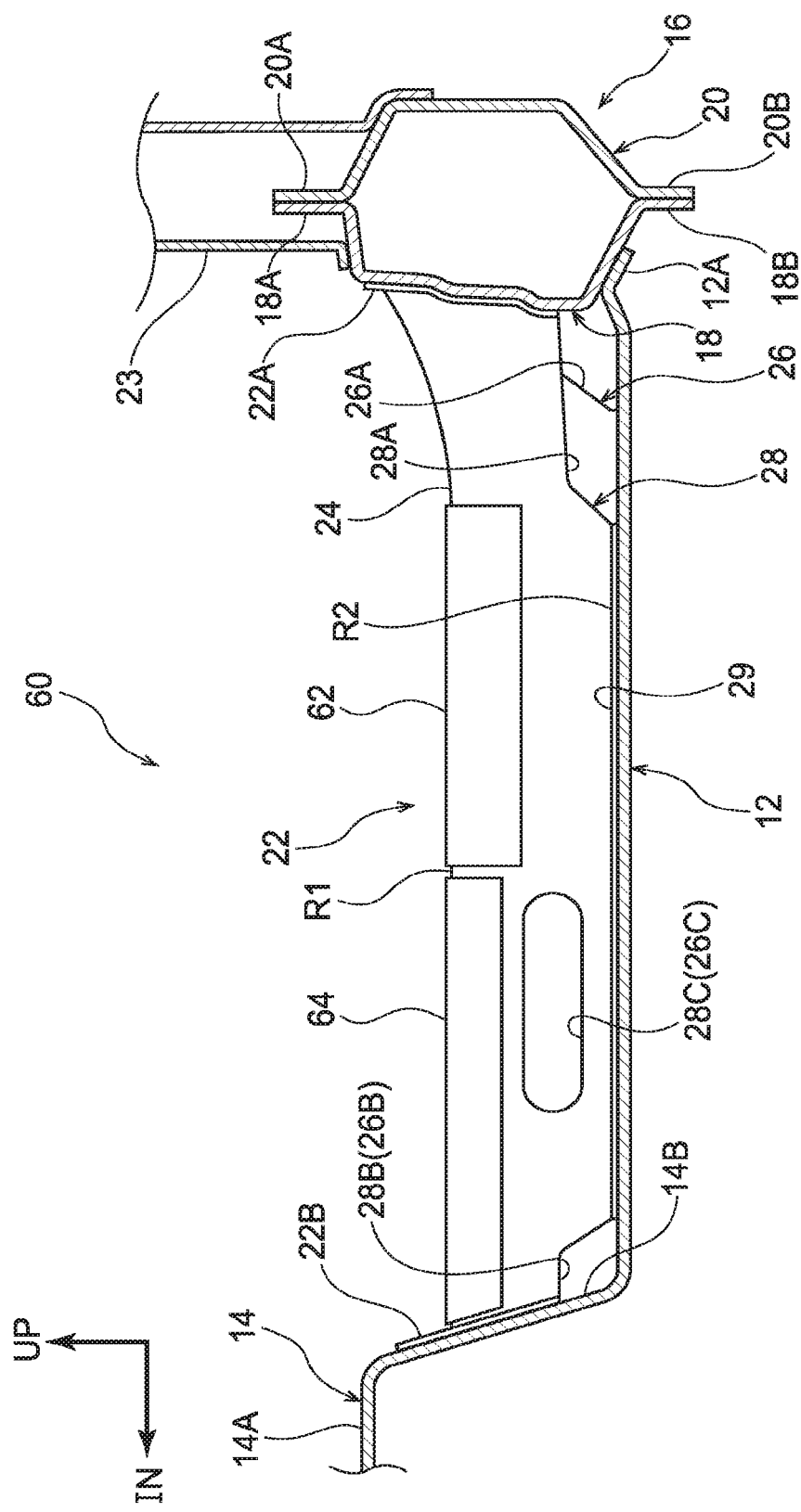

VEHICLE LOWER SECTION STRUCTURE

CROSS-REFERENCE TO RELATED APPLICATION

This application is based on and claims priority under 35 USC 119 from Japanese Patent Application No. 2015-215020 filed on Oct. 30, 2015, the disclosure of which is incorporated by reference herein.

BACKGROUND

Technical Field

The present invention relates to a vehicle lower section structure.

Related Art

Japanese Patent Application Laid-Open (JP-A) No. 2010-228482 describes a configuration in which a floor cross member with a hat shaped cross-section that, together with a floor panel, configures a closed cross-section, is disposed as a structure in which the floor cross member couples a rocker and a floor tunnel together. A lower edge portion of an end portion at the rocker (side sill) side of the floor cross member is configured with a notched shape, and a gap is provided between the lower edge portion and the floor panel.

In a collision mode in which a vehicle with a high vehicle height, such as a Sport Utility Vehicle (SUV), collides from the side, collision load is mainly input through a center pillar. However, the technology described in JP-A No. 2010-228482 does not take this point into consideration. There is therefore room for improvement from the viewpoint of controlling deformation of the floor cross member according to respective collision modes of side collisions.

SUMMARY

In consideration of the above circumstances, an object of the present embodiment is to obtain a vehicle lower section structure capable of controlling deformation of a floor cross member according to respective collision modes of side collisions.

A first aspect provides a vehicle lower section structure including:

a pair of rockers that are respectively provided at each vehicle width direction end portion of a floor panel, and that extend along a vehicle front-rear direction;

a floor tunnel that is provided running along the vehicle front-rear direction at a vehicle width direction intermediate section of the floor panel, and that opens toward a vehicle lower side; and a floor cross member that extends along the vehicle width direction and couples the rocker and the floor tunnel together, that includes an upper wall, a front wall extending downward from a front end portion of the upper wall, and a rear wall extending downward from a rear end portion of the upper wall that together with the floor panel configure a closed cross-section, wherein of the front wall and the rear wall, a first cutout portion is formed in a lower edge of an end portion at the rocker side of the wall further from a center pillar, and a second cutout portion that is smaller than the first cutout portion is formed in a lower edge of an end portion at the rocker side of the wall closer to the center pillar.

In the vehicle lower section structure of the first aspect, the rocker and the floor tunnel are coupled together by the floor cross member that extends along the vehicle width direction. The floor cross member includes the upper wall, the front wall, and the rear wall, and, together with the floor tunnel, configures a closed cross-section. Out of the front wall and the rear wall, the first cutout portion is formed in the lower edge of the end portion on the rocker side of the wall further from the center pillar. The second cutout portion is formed in the lower edge of the end portion at the rocker side of the wall closer to the center pillar. The strength of the lower portion side of the floor cross member can thereby be made lower than that of the upper portion side. As a result, in a collision mode in which collision load is mainly input to the upper portion of the floor cross member, load is transmitted through a ridge line on the upper portion side. The floor cross member can accordingly transmit a certain amount of collision load toward the side opposite to the collision through the floor tunnel without folding. In a collision mode in which collision load is input to both upper portion and lower portion sides of the floor cross member, a difference in strength between the upper portion and the lower portion of the floor cross member arises due to a ridge line on the lower portion side being interrupted. The floor cross member therefore folds, enabling concentration of collision load at the floor tunnel to be suppressed.

The second cutout portion formed in the wall closer to the center pillar is formed smaller than the first cutout portion. Thus, even in a collision mode in which collision load is input mainly through the center pillar, the floor cross member can be suppressed from folding until a certain amount of collision load has been input. Deformation of the floor cross member can be controlled according to respective collision modes of side collisions in this manner. Note that here, there is no limitation to forming the "cutout portions" by actual cutting out, and is a broad concept encompassing structures including cutout shapes. Moreover, interrupting the ridge lines is necessary.

A second aspect provides the vehicle lower section structure of the first aspect, wherein the first cutout portion and the second cutout portion are formed further to a lower side than a position of half of a height of the floor cross member from the floor panel to an upper face of the upper wall.

The vehicle lower section structure of the second aspect enables the strength of the upper portion of the floor cross member to be secured due to forming the first cutout portion and the second cutout portion further to the lower side than the position of half of the height of the floor cross member.

A third aspect provides the vehicle lower section structure of the first aspect, wherein:

the first cutout portion and the second cutout portion are formed with cutout heights along the vehicle up-down direction, which are equal; and a cutout width of the first cutout portion along the vehicle width direction is formed longer than a front-rear width of the upper wall along the vehicle front-rear direction, and a cutout width of the second cutout portion along the vehicle width direction is formed shorter than the front-rear width of the upper wall.

The vehicle lower section structure of the third aspect enables the floor cross member to be set to an appropriate strength. Namely, in cases in which the cutout width of the first cutout portion is shorter than the front-rear width of the upper wall of the floor cross member, the strength of the floor cross member would become too high, making it difficult to fold the floor cross member, and there is a possibility that collision load would concentrate in the floor tunnel. Moreover, in cases in which the cutout width of the second cutout portion is longer than the front-rear width of the upper wall, the strength of the floor cross member would become too low, making the floor cross member easy to fold, and there is a possibility of being unable to transmit collision load effectively to the collision-opposite side. Thus, by setting the cutout widths of the first cutout portion and the second cutout portion so as to satisfy the above relationship, the floor cross member can be set to an appropriate strength.

A fourth aspect provides the vehicle lower section structure of the first aspect, wherein, in addition to the first cutout portion and the second cutout portion, weakened portions are respectively formed in a lower portion of the front wall and a lower portion of the rear wall.

In the vehicle lower section structure of the fourth aspect, the weakened portions are respectively formed in the lower portion of the front wall and the lower portion of the rear wall. Thus, in a collision with a collision mode in which collision load is input to both the upper portion and the lower portion sides of the floor cross member, the floor cross member can fold more easily not only at the locations where the first cutout portion and the second cutout portion are formed, but also at the locations where the weakened portions are formed. As a result, the amount of folding of the floor cross member can be increased compared to a configuration in which the weakened portions are not formed.

A fifth aspect provides the vehicle lower section structure of the first aspect, wherein a reinforcement member that reinforces a ridge line on an upper portion side of the floor cross member is provided at an upper portion of the floor cross member.

The vehicle lower section structure of the fifth aspect enables the strength of the ridge line on the upper portion side of the floor cross member to be raised at the location provided with the reinforcement member.

As explained above, the vehicle lower section structure of the first aspect has the excellent advantageous effect of enabling deformation of the floor cross member to be controlled according to respective collision modes of side collisions.

The vehicle lower section structure of a second aspect has the excellent advantageous effect of enabling the floor cross member to be suppressed from folding readily in a collision with a collision mode in which collision load is mainly input to the upper portion of the floor cross member.

The vehicle lower section structure of the third aspect has the excellent advantageous effect of enabling the floor cross member to be set to an appropriate strength.

The vehicle lower section structure of the fourth aspect has the excellent advantageous effect of enabling collision load to be effectively suppressed from concentrating in the floor tunnel.

The vehicle lower section structure of the fifth aspect has the excellent advantageous effect of enabling a difference in strength to be made between the upper portion and the lower portion of the floor cross member with a simple structure.

BRIEF DESCRIPTION OF THE DRAWINGS

Exemplary embodiments of the present invention will be described in detail based on the following figures, wherein:

FIG. 5 is a back view corresponding to FIG. 1, illustrating a vehicle lower section structure according to a third exemplary embodiment.

DETAILED DESCRIPTION

First Exemplary Embodiment

Figure 1:
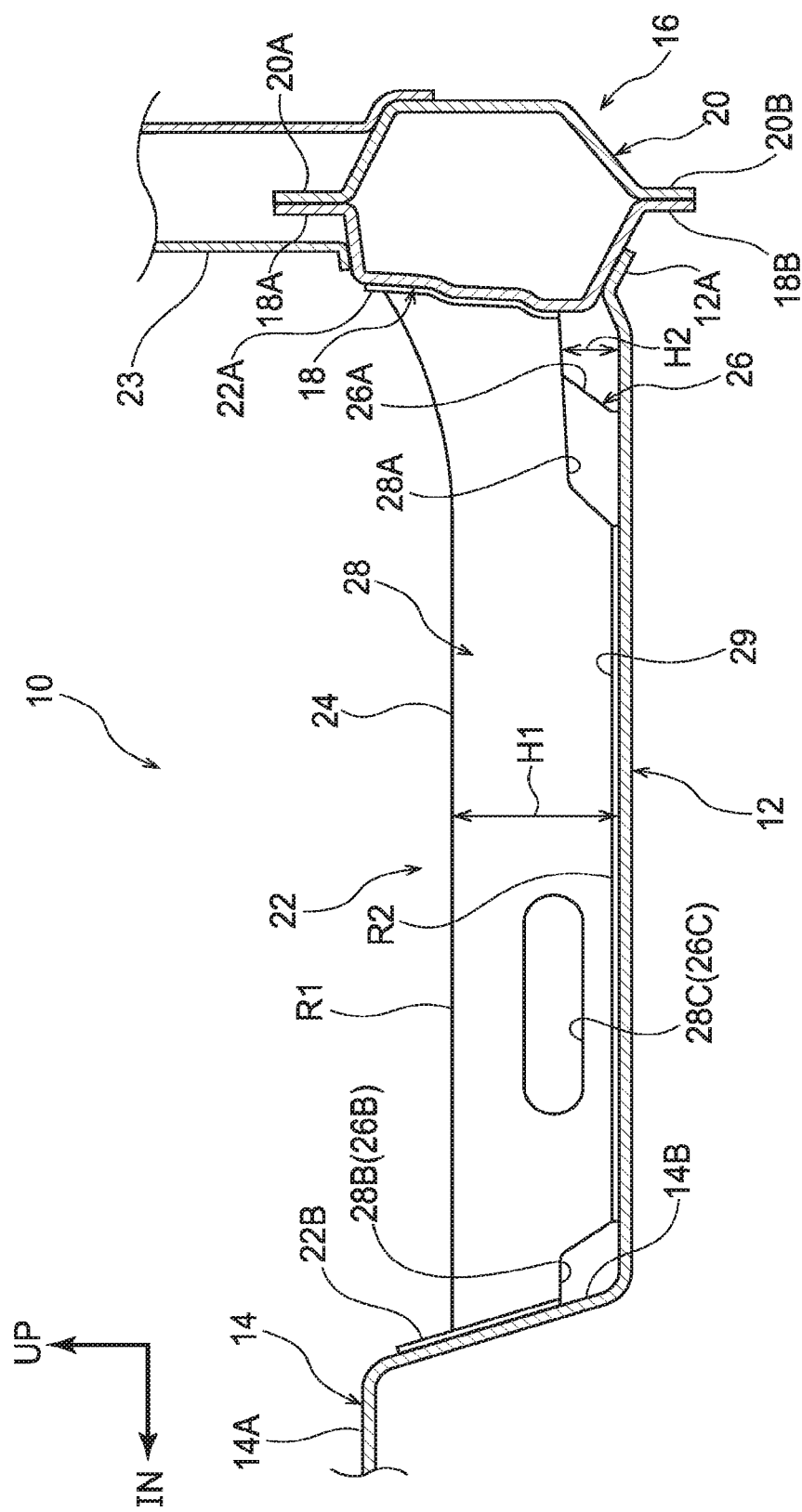
FIG. 1 is a back view of a vehicle lower section structure according to a first exemplary embodiment, as viewed from the vehicle rear side.
Figure 2:
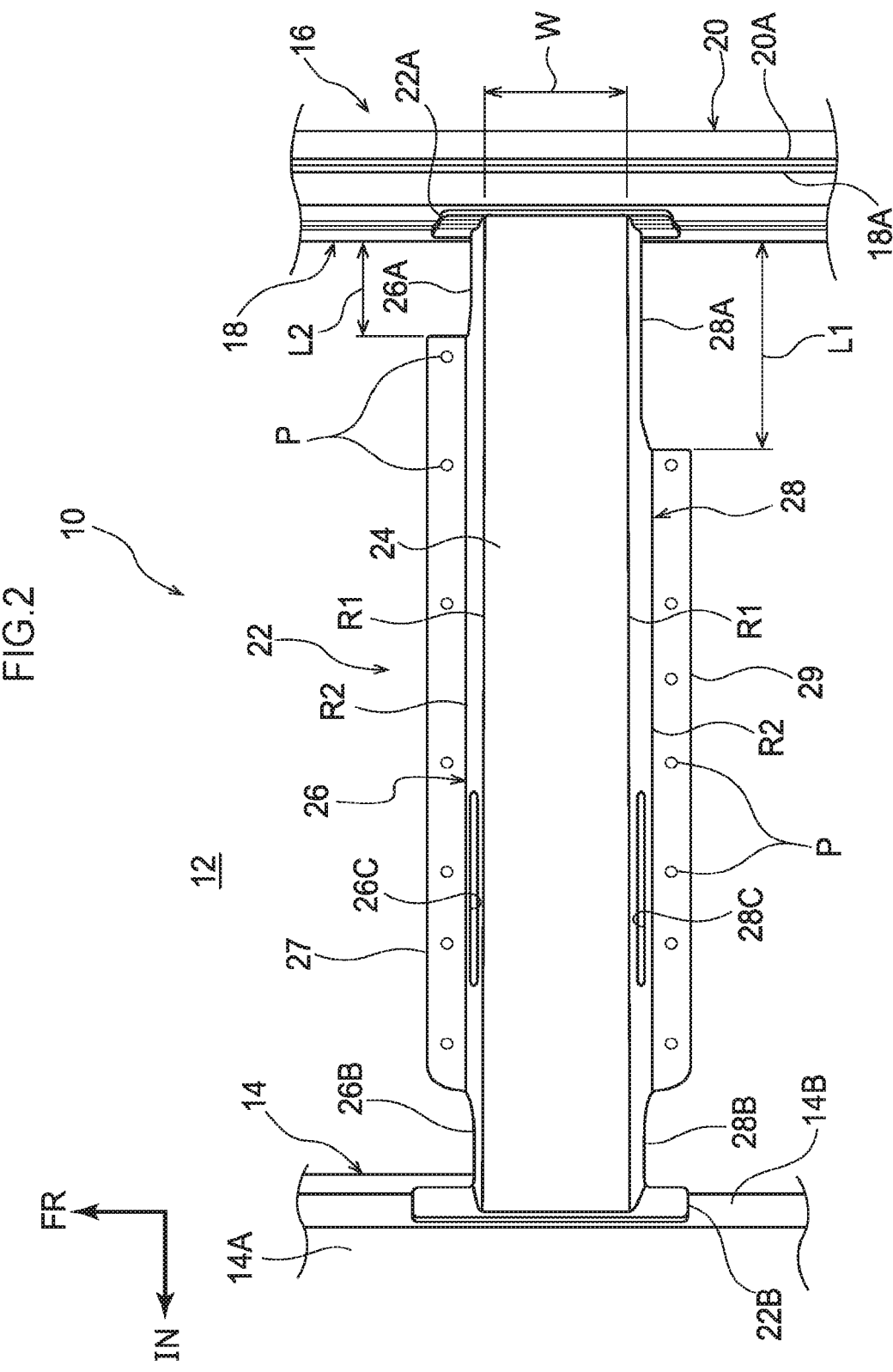
FIG. 2 is a plan view of a vehicle lower section structure according to the first exemplary embodiment, as viewed from the vehicle upper side.

Explanation follows regarding a vehicle lower section structure according to a first exemplary embodiment of the present invention, with reference to FIG. 1 and FIG. 2. Note that in the respective drawings, the arrow FR indicates the vehicle front side, the arrow UP indicates the vehicle upper side, and the arrow IN indicates the vehicle width direction inside, as appropriate. Unless specifically stated otherwise, in the following explanation, reference to the front-rear, up-down, and left-right directions refers to front-rear in the vehicle front-rear direction, up-down in the vehicle up-down direction, and left-right when facing the direction of travel.

As illustrated in FIG. 1, a floor panel 12 configuring a floor section of a vehicle cabin is disposed at a vehicle lower section 10 of a vehicle applied with the vehicle lower section structure of the present exemplary embodiment. The floor panel 12 configures a bottom face of the vehicle, and is formed from a substantially rectangular shaped plate member in vehicle plan view. A floor tunnel 14 that is formed by bulging the floor panel 12 out in the vehicle upward direction is provided at a vehicle width direction intermediate section of the floor panel 12. End portions 12A at vehicle width direction outsides of the floor panel 12 are joined to rockers 16, described later. Note that although the vehicle left side of the vehicle lower section 10 illustrated in each of the drawings is omitted from illustration, the vehicle left side and the vehicle right side of the vehicle lower section 10 are formed substantially symmetrical to each other about the floor tunnel 14.

The floor tunnel 14 extends along the vehicle front-rear direction, and a cross-section profile of the floor tunnel 14 sectioned vertically along the vehicle width direction is formed in a substantially U shape open to the vehicle lower side. The floor tunnel 14 is configured including an upper face 14A, a right side face 14B that extends out downward from an end portion at a right side of the upper face 14A, and a left side face, not illustrated in the drawings, extending out downward from an end portion at a left side of the upper face 14A. A front end portion of the floor tunnel 14 is joined to a dash panel, not illustrated in the drawings, at a vehicle cabin front section, and a rear end portion of the floor tunnel 14 extends as far as a rear end section of the floor panel 12.

The rockers 16 are provided, in a left and right pair, at each vehicle width direction end portion of the floor panel 12. Although illustration and explanation below are regarding the rocker 16 at the vehicle right side, the rocker at the vehicle left side is configured similarly thereto.

The rocker 16 extends along the vehicle front-rear direction, and has a closed cross-section structure including a rocker inner panel 18 that is disposed at the vehicle width direction inside, and a rocker outer panel 20 that is disposed at the vehicle width direction outside.

A cross-section profile of the rocker inner panel 18 sectioned vertically along the vehicle width direction is formed in a substantially hat shape open to the vehicle width direction outside, and an inner side upper flange 18A extends out upward from an upper portion of the rocker inner panel 18 toward the vehicle upward direction. An inner side lower flange 18B extends out from a lower portion of the rocker inner panel 18 toward the vehicle downward direction.

The rocker outer panel 20 is disposed facing the rocker inner panel 18 in the vehicle width direction, and a cross-section profile of the rocker outer panel 20 sectioned vertically along the vehicle width direction is formed in a substantially hat shape open to the vehicle width direction inside. An outer side upper flange 20A extends out from an upper portion of the rocker outer panel 20 toward the vehicle upward direction, and the outer side upper flange 20A is joined to the inner side upper flange 18A.

An outer side lower flange 20B extends out from a lower portion of the rocker outer panel 20 toward the vehicle downward direction, and the outer side lower flange 20B is joined to the inner side lower flange 18B. Note that rocker reinforcement or the like may be disposed inside the closed cross-section of the rocker 16.

A floor cross member 22 is provided between each of the rockers 16 and the floor tunnel 14. The floor cross members 22 are provided on the left and right side of the floor tunnel 14, and respectively extend along the vehicle width direction and couple the rockers 16 and the floor tunnel 14 together. Note that in the following explanation, explanation is given regarding the floor cross member 22 at the vehicle right side. However, the floor cross member 22 at the vehicle left side is configured similarly thereto.

The floor cross member 22 of the present exemplary embodiment is disposed further to the vehicle rear side than a center pillar 23 that extends along the vehicle up-down direction. An end portion at the vehicle width direction inside of the floor cross member 22 is joined to the right side face 14B of the floor tunnel 14, and an end portion at the vehicle width direction outside of the floor cross member 22 is joined to the rocker inner panel 18. Detailed explanation follows regarding the floor cross member 22.

As illustrated in FIG. 1 and FIG. 2, the floor cross member 22 is configured including an upper wall 24, a front wall 26, and a rear wall 28. The upper wall 24 configures an upper face of the floor cross member 22, and is formed in a substantially rectangular shape with its plate thickness direction in the vehicle up-down direction and its length direction in the vehicle width direction in plan view. An end portion of the upper wall 24 at the rocker 16 side is curved so as to be positioned further toward the vehicle upward direction on progression toward the vehicle width direction outside.

The front wall 26 extends downward from a front end portion of the upper wall 24, and a front flange 27 extends out from a lower end portion of the front wall 26 toward the vehicle front. The front flange 27 is formed by bending the lower end portion of the front wall 26 toward the vehicle front, and overlaps with an upper face of the floor panel 12. The front flange 27 is welded to the floor panel 12 at weld points P. The front wall 26 of the present exemplary embodiment is inclined toward the vehicle front on progression from an upper end to a lower end.

The rear wall 28 extends downward from a rear end portion of the upper wall 24, and a rear flange 29 extends out from a lower end portion of the rear wall 28 toward the vehicle rear. The rear flange 29 is formed by bending the lower end portion of the rear wall 28 toward the vehicle rear, and overlaps with the upper face of the floor panel 12. The rear flange 29 is also welded to the floor panel 12 at weld points P. The rear wall 28 of the present exemplary embodiment is inclined toward the vehicle rear on progression from an upper end to a lower end.

An outer flange 22A is provided to an end portion on the rocker 16 side (the vehicle width direction outside) of the floor cross member 22. The outer flange 22A extends out along the rocker inner panel 18 from the upper wall 24, the front wall 26, and the rear wall 28 respectively, and is joined to the rocker inner panel 18 by welding or the like.

An inner flange 22B is provided to an end portion at the floor tunnel 14 side (the vehicle width direction inside) of the floor cross member 22. The inner flange 22B extends out along the right side face 14B of the floor tunnel 14 from the upper wall 24, the front wall 26, and the rear wall 28 respectively, and is joined to the right side face 14B by welding or the like.

The floor cross member 22 is configured including the upper wall 24, the front wall 26, and the rear wall 28 as described above, such that a cross-section profile of the floor cross member 22 sectioned vertically along the vehicle front-rear direction has a substantially hat shape open to the vehicle lower side. Thus, a closed cross-section is configured by the floor cross member 22 and the floor panel 12. Upper side ridge lines R1 extending along the vehicle width direction are respectively formed at a boundary between the upper wall 24 and the front wall 26, and at a boundary between the upper wall 24 and the rear wall 28. Lower side ridge lines R2 extending along the vehicle width direction are respectively formed at a boundary between the front wall 26 and the front flange 27, and at a boundary between the rear wall 28 and the rear flange 29.

Note that the floor cross member 22 of the present exemplary embodiment is disposed further to the vehicle rear side than the center pillar 23 such that out of the front wall 26 and the rear wall 28, the wall that is further from the center pillar 23 is the rear wall 28, and the wall that is closer to the center pillar 23 is the front wall 26. A first cutout portion 28A is formed in a lower edge of an end portion at the rocker 16 side of the rear wall 28. A second cutout portion 26A is formed in a lower edge of an end portion at the rocker 16 side of the front wall 26.

The first cutout portion 28A is formed in a shape cut out from the lower edge of the rear wall 28, and the rear flange 29 is not provided at a location formed with the first cutout portion 28A. Thus, the lower side ridge line R2 is interrupted at this location.

As illustrated in FIG. 1, the first cutout portion 28A is formed such that a cutout height H2 in the vehicle up-down direction becomes gradually lower on progression from an end portion at the rocker 16 side toward the vehicle width direction inside. In other words, a lower rim of the rear wall 28 is gradually inclined downward from the end portion at the rocker 16 side on progression toward the vehicle width direction inside. At an end portion at the vehicle width direction inside of the first cutout portion 28A, the lower rim of the rear wall 28 has a greater downward incline than other locations, and is linked to the rear flange 29.

Note that the first cutout portion 28A is formed further to the lower side of the floor cross member 22 than a position at half of a height H1 (a height from the floor panel 12 to the upper wall 24) of the floor cross member 22. In other words, the cutout height H2 of the first cutout portion 28A in the vehicle up-down direction, is formed so as to be lower than a height H1/2, this being half the height of the floor cross member 22.

As illustrated in FIG. 2, a cutout width L1 (cutout length) of the first cutout portion 28A in the vehicle width direction is formed longer than a front-rear width W of the upper wall 24 in the vehicle front-rear direction.

The first cutout portion 28A is formed in a shape cut out from the lower edge of the front wall 26, and the front flange 27 is not provided at a location formed with the second cutout portion 26A. Thus, the lower side ridge line R2 is interrupted at this location. The second cutout portion 26A is formed with the same cutout height as that of the first cutout portion 28A. In the back view illustrated in FIG. 1, the upper rim at the rocker 16 side of the first cutout portion 28A and an upper rim at the rocker 16 side of the second cutout portion 26A overlap each other. Note that here, "the same cutout height" is a broad concept that encompasses configurations in which the cutout heights of the first cutout portion 28A and of the second cutout portion 26A are slightly different from each other due to manufacturing tolerance and the like.

The second cutout portion 26A is formed smaller than the first cutout portion 28A. In the present exemplary embodiment, the cutout heights of the first cutout portion 28A and of the second cutout portion 26A are the same height, and the cutout width of the second cutout portion 26A in the vehicle width direction is formed shorter than that of the first cutout portion 28A. At an end portion at the vehicle width direction inside of the second cutout portion 26A, a lower rim of the front wall 26 has a greater downward incline than at other locations, and is linked to the front flange 27. Note that here, "smaller than the first cutout portion 28A" means that the area of an opening in the front wall 26 due to the second cutout portion 26A is smaller than the area of an opening in the rear wall 28 due to the first cutout portion 28A when the floor cross member 22 is viewed from the vehicle front side or from the vehicle rear. Thus, even when the cutout widths of the first cutout portion 28A and of the second cutout portion 26A are the same width, as long as the cutout height of the second cutout portion 26A is lower than the cutout height of the first cutout portion 28A, the second cutout portion 26A is formed smaller than the first cutout portion 28A.

As illustrated in FIG. 2, a cutout width L2 (cutout length) of the second cutout portion 26A is formed shorter than the cutout width L1 of the first cutout portion 28A, and also formed shorter than the front-rear width W of the upper wall 24 in the vehicle width direction. In the present exemplary embodiment, the cutout width L2 of the second cutout portion 26A is substantially half the width of the cutout width L1 of the first cutout portion 28A. The front flange 27 thereby extends toward the vehicle width direction outside further to the rocker 16 side than the rear flange 29 by the amount by which the cutout width L2 of the second cutout portion 26A is formed shorter, and the weld points P are set further to the rocker 16 side than on the rear flange 29.

A third cutout portion 28B is formed in a lower edge of an end portion at the floor tunnel 14 side of the rear wall 28, and a fourth cutout portion 26B is formed in a lower edge of an end portion at the floor tunnel 14 side of the front wall 26. The third cutout portion 28B and the fourth cutout portion 26B are formed with substantially the same shape and substantially the same size as each other, and in the present exemplary embodiment, are formed slightly smaller than the second cutout portion 26A.

A rear side duct hole 28C is formed in the rear wall 28 between the first cutout portion 28A and the third cutout portion 28B, and a front side duct hole 26C is formed in the front wall 26 between the second cutout portion 26A and the fourth cutout portion 26B. The rear side duct hole 28C and the front side duct hole 26C are formed substantially in elongated circular shapes with their length directions in the vehicle width direction in front view or back view. The rear side duct hole 28C and the front side duct hole 26C are formed at positions overlapping each other in front view or back view, and a duct, not illustrated in the drawings, is inserted through the rear side duct hole 28C and the front side duct hole 26C.

Operation and Advantageous Effects

Explanation follows regarding operation and advantageous effects of the vehicle lower section structure of the present exemplary embodiment.

In the present exemplary embodiment, the first cutout portion 28A is formed in the lower edge of the end portion at the rocker 16 side of the rear wall 28, and the second cutout portion 26A is formed in the lower edge of the end portion at the rocker 16 side of the front wall 26, of the floor cross member 22. Thus, in a collision mode in which collision load is mainly input to an upper portion of the floor cross member 22, the floor cross member 22 can transmit a certain amount of collision load toward the opposite side to the collision through the floor tunnel 14 without folding. In a collision mode in which collision load is input to both upper portion and lower portion sides of the floor cross member 22, the floor cross member 22 folds due to the difference in strength between the upper portion and the lower portion of the floor cross member 22, and collision load can be suppressed from concentrating at the floor tunnel 14.

In the above operation, for example, the rocker 16 sometimes rotates about a rotation axis along the vehicle front-rear direction in a collision mode in which a vehicle that has a high vehicle height, such as an SUV, collides from the side (MDB side collision). In such cases, collision load is mainly input to the upper portion (the upper side ridge line R1) of the floor cross member 22. Collision load is transmitted to the opposite side to the collision through the floor panel 12 without folding the floor cross member 22 due to the upper portion of the floor cross member 22 having higher strength than the lower portion of the floor cross member 22 that is formed with the first cutout portion 28A and the second cutout portion 26A.

In a collision mode such as a side collision with a pole, collision load is input to both the upper portion (upper side ridge lines R1) and the lower portion (lower side ridge lines R2) sides of the floor cross member 22 due to intrusion of the rocker 16 toward the vehicle width direction inside without rotation. Note that in a structure of a comparative example that is not formed with the first cutout portion 28A and the second cutout portion 26A, collision load concentrates in the floor tunnel 14 without folding the floor cross member 22, and the floor tunnel 14 could collapse. In such cases, sometimes join portions between the floor panel 12 and a front panel at the vehicle front side and a center panel at the vehicle front-rear direction central side rupture or the like, and a space inside the vehicle cabin is greatly deformed. In contrast thereto, in the present exemplary embodiment, the first cutout portion 28A and the second cutout portion 26A are formed in the floor cross member 22. The lower side ridge lines R2 are therefore interrupted such that the strength of the lower portion of the floor cross member 22 is reduced. The floor cross member 22 accordingly folds and the collision load can be suppressed from concentrating in the floor tunnel 14 in a side collision such as a side collision with a pole.

As illustrated in FIG. 2, in the present exemplary embodiment, the second cutout portion 26A formed in the front wall 26 which is closer to the center pillar 23 is smaller than the first cutout portion 28A formed in the rear wall 28 further from the center pillar 23. Thus, even in a collision mode in which collision load is mainly input through the center pillar 23, the floor cross member 22 can be suppressed from folding until a certain amount of collision load has been input. Deformation of the floor cross member 22 can thereby be controlled according to respective collision modes of side collisions.

As illustrated in FIG. 1, in the present exemplary embodiment, in particular, the cutout height of the first cutout portion 28A and the cutout height of the second cutout portion 26A are set to the same height H2. A difference in strength between the front wall 26 and the rear wall 28 can accordingly be suppressed from becoming large. The first cutout portion 28A and the second cutout portion 26A are formed further to the lower side than the position of half of the height H1 of the floor cross member 22, thereby enabling the strength of the upper portion of the floor cross member 22 to be secured. As a result, the floor cross member 22 can be suppressed from folding easily in a collision with a collision mode in which collision load is input mainly to the upper portion of the floor cross member 22.

As illustrated in FIG. 2, in the present exemplary embodiment, the cutout width L1 of the first cutout portion 28A is longer than the front-rear width W of the upper wall 24, and the cutout width L2 of the second cutout portion 26A is shorter than the front-rear width W, such that the floor cross member 22 can be set to an appropriate strength. Namely, in a structure of a comparative example in which the cutout width of the first cutout portion 28A is shorter than the front-rear width W of the upper wall 24, the strength of the floor cross member 22 becomes too high and the floor cross member 22 becomes difficult to fold, and there is a possibility of collision load concentrating in the floor tunnel 14. In a structure of a comparative example in which the cutout width of the second cutout portion 26A is longer than the front-rear width W, the strength of the floor cross member 22 becomes too low and the floor cross member 22 becomes easy to fold, and there is a possibility of being unable to transmit collision load effectively to the opposite side to the collision. In contrast thereto, the floor cross member 22 can be set to an appropriate strength, and crash safety performance in a side collision can be improved by setting the cutout width L1 of the first cutout portion 28A and the cutout width L2 of the second cutout portion 26A as described above.

Second Exemplary Embodiment

Figure 3:
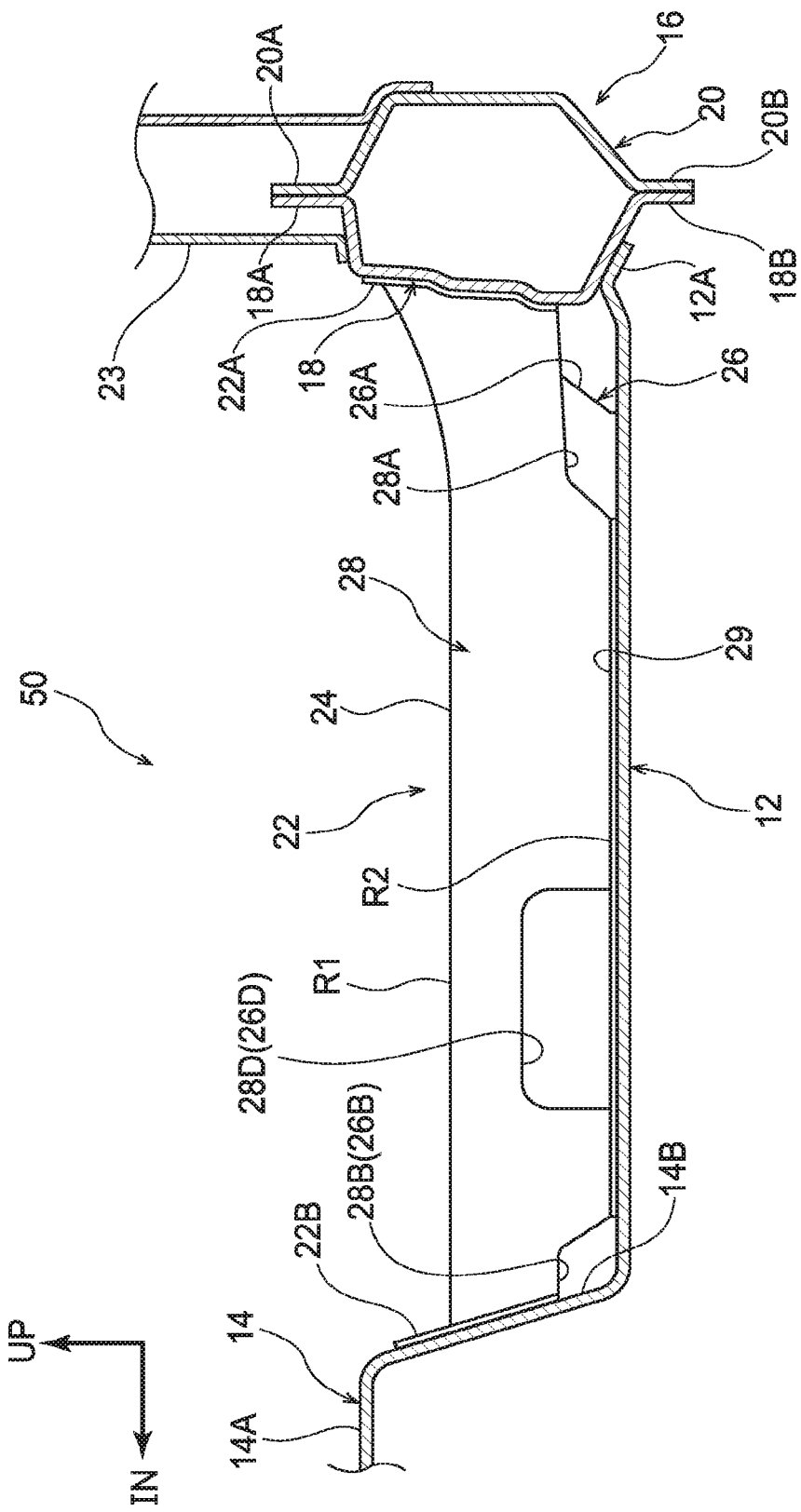
FIG. 3 is a back view corresponding to FIG. 1, illustrating a vehicle lower section structure according to a second exemplary embodiment.
Figure 4:
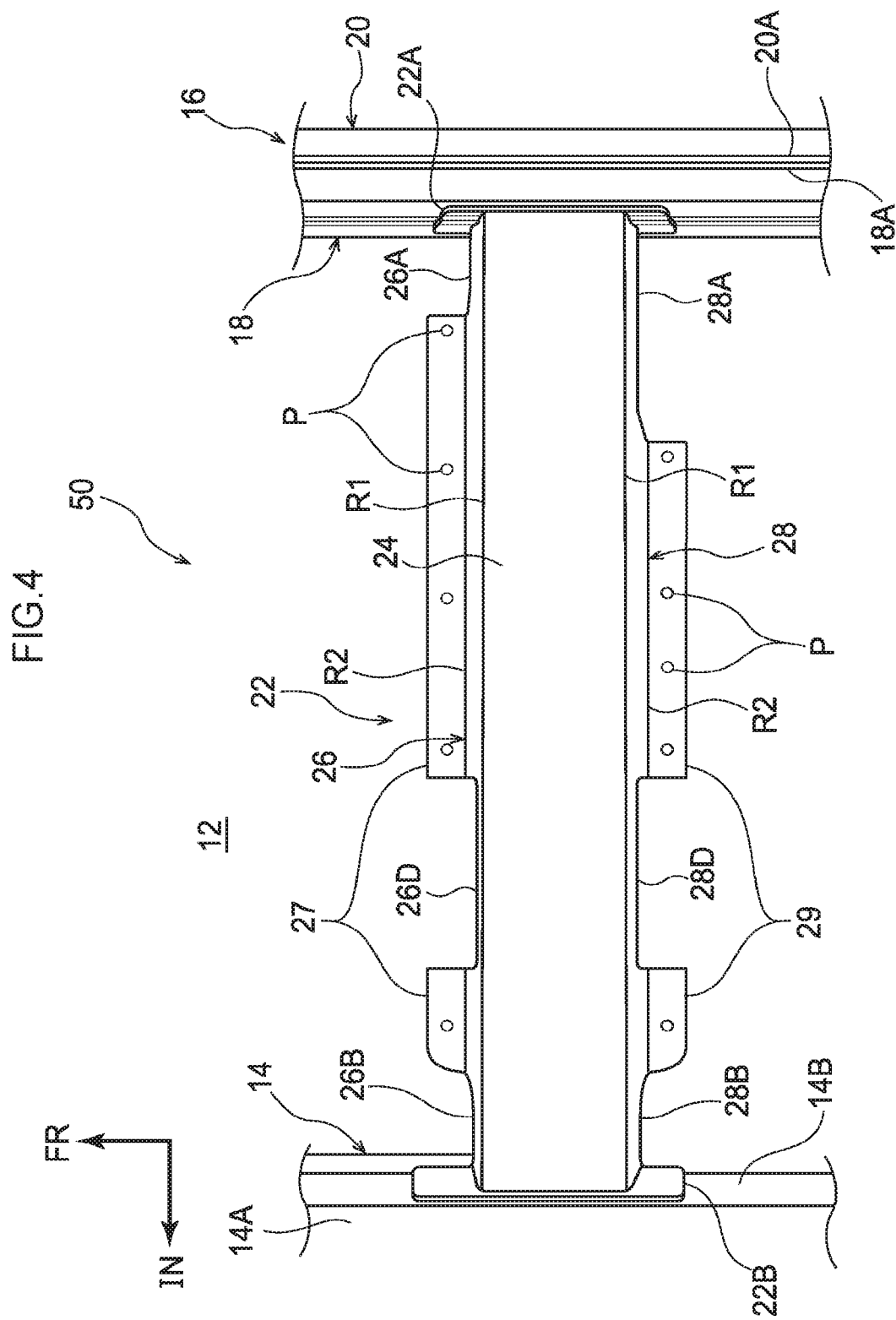
FIG. 4 is a plan view corresponding to FIG. 2, illustrating a vehicle lower section structure according to a second exemplary embodiment.

Next, explanation follows regarding a vehicle lower section structure according to a second exemplary embodiment of the present invention, with reference to FIG. 3 and FIG. 4. Note that configuration similar to that of the first exemplary embodiment is appended with the same reference numerals, and explanation thereof is omitted as appropriate.

As illustrated in FIG. 3 and FIG. 4, a fifth cutout portion 28D, serving as a weakened portion, is formed in place of the rear side duct hole 28C in the rear wall 28 of the floor cross member 22 configuring a vehicle lower section structure 50 of the present exemplary embodiment. Moreover, a sixth cutout portion 26D, serving as a weakened portion, is formed in place of the front side duct hole 26C in the front wall 26 of the floor cross member 22.

As illustrated in FIG. 3, the fifth cutout portion 28D is formed at a position offset further to the vehicle width direction outside than the third cutout portion 28B of the rear wall 28, and is formed by cutting out a substantially rectangular shape from the lower edge of the rear wall 28. As illustrated in FIG. 4, the rear flange 29 is not provided at the location where the fifth cutout portion 28D is formed. Thus, the rear flange 29 is split into a rocker 16 side from the fifth cutout portion 28D and a floor tunnel 14 side from the fifth cutout portion 28D.

The sixth cutout portion 26D is formed with substantially the same shape and substantially the same size as the fifth cutout portion 28D, and is formed at a position overlapping with the fifth cutout portion 28D in back view. As illustrated in FIG. 4, the front flange 27 is not provided at the location where the sixth cutout portion 26D is formed. Thus, the front flange 27 is split into a rocker 16 side from the sixth cutout portion 26D and a floor tunnel 14 side from the sixth cutout portion 26D.

Operation and Advantageous Effects

Next, explanation follows regarding operation and advantageous effects of the vehicle lower section structure of the present exemplary embodiment.

In the present exemplary embodiment, the floor cross member 22 can be made to deform by a larger amount than in the structure of the first exemplary embodiment during a collision with a collision mode in which collision load is input to both the upper portion and the lower portion sides of the floor cross member 22. Namely, in cases in which amount of folding of the floor tunnel 14 of the structure of the first exemplary embodiment would be insufficient, the amount of folding of the floor cross member 22 can be increased, and collision load can be effectively suppressed from concentrating in the floor tunnel 14 by weakening locations other than the first cutout portion 28A and the second cutout portion 26A, as in the present exemplary embodiment. The amount of folding of the floor cross member 22 can be freely set by changing the sizes of the fifth cutout portion 28D and the sixth cutout portion 26D. Other operation is similar to that of the first exemplary embodiment.

Third Exemplary Embodiment

Next, explanation follows regarding a vehicle lower section structure according to a third exemplary embodiment of the present invention, with reference to FIG. 5. Note that configuration similar to that of the first exemplary embodiment is appended with the same reference numerals, and explanation thereof is omitted as appropriate.

As illustrated in FIG. 5, in a vehicle lower section structure 60 according to the present exemplary embodiment, a first reinforcement plate 62 and a second reinforcement plate 64, serving as reinforcement members, are provided to the upper portion of the floor cross member 22.

The first reinforcement plate 62 is provided to a vehicle width direction intermediate portion of the floor cross member 22 and has a cross-section profile, vertically sectioned along the vehicle front-rear direction, configured in a substantially U shape open to the vehicle lower side. The upper wall 24, the upper portion of the front wall 26, and the upper portion of the rear wall 28 of the floor cross member 22 are covered by the first reinforcement plate 62. The upper side ridge lines R1 are thereby reinforced.

The second reinforcement plate 64 is provided further to the floor tunnel 14 side than the first reinforcement plate 62. The second reinforcement plate 64 has a cross-section profile, vertically sectioned along the vehicle front-rear direction, configured in a substantially U shape open to the vehicle lower side, and the second reinforcement plate 64 is formed with a vehicle up-down direction length that is shorter than that of the first reinforcement plate 62. The upper wall 24, the upper portion of the front wall 26, and the upper portion of the rear wall 28 of the floor cross member 22 are covered by the second reinforcement plate 64. The upper side ridge lines R1 are thereby reinforced. Note that the first reinforcement plate 62 and the second reinforcement plate 64 may be joined to the floor cross member 22 by welding or the like, or may be fastened by nuts and bolts.

Operation and Advantageous Effects

Next, explanation follows regarding operation and advantageous effects of the vehicle lower section structure of the present exemplary embodiment.

In the present exemplary embodiment, a difference in strength between the upper portion and the lower portion of the floor cross member 22 can be made larger than in the structure of the first exemplary embodiment using a simple structure configured just by joining the first reinforcement plate 62 and the second reinforcement plate 64. The position where the floor cross member 22 folds can be controlled to a certain degree by adjusting the positions of the first reinforcement plate 62 and the second reinforcement plate 64. Other operation is similar to that of the first exemplary embodiment.

Explanation has been given above regarding vehicle lower section structures according to the first exemplary embodiment to the third exemplary embodiment of the present invention. However, obviously various specifications may be implemented within a range not departing from the spirit of the present invention. For example, in the above exemplary embodiments, explanation has been given regarding the floor cross member 22 that is disposed further to the vehicle rear side than the center pillar 23. However, there is no limitation thereto, and the present invention may be applied to a floor cross member disposed further to the vehicle front side than the center pillar 23. In such cases, in the floor cross member, the "wall that is further from the center pillar" is the front wall at the vehicle front side, and the "wall that is closer to the center pillar" is the rear wall at the vehicle rear side. The first cutout portion is accordingly formed in the lower edge of the end portion at the rocker 16 side of the front wall. The second cutout portion that is smaller than the first cutout portion is formed in the lower edge of the end portion at the rocker 16 side of the rear wall.

In the above exemplary embodiments, the cutout height of the first cutout portion 28A and the cutout height of the second cutout portion 26A are set to the same height H2. However, there is no limitation thereto. For example, the cutout height of the first cutout portion 28A may be formed higher than the cutout height of the second cutout portion 26A.

In the above exemplary embodiments, the third cutout portion 28B is formed in the rear wall 28, and the fourth cutout portion 26B is formed in the front wall 26. However, there is no limitation thereto. Configuration may be made in which the third cutout portion 28B and the fourth cutout portion 26B are not formed. There is no particular limitation to the shapes of the first cutout portion 28A, the second cutout portion 26A, the third cutout portion 28B, and the fourth cutout portion 26B, and the respective shapes thereof may be different to each other.

Furthermore, the rear side duct hole 28C and the front side duct hole 26C are formed in the first exemplary embodiment. However, there is no limitation thereto, and configuration may be made in which the rear side duct hole 28C and the front side duct hole 26C are not formed.

In the second exemplary embodiment, the fifth cutout portion 28D formed in the rear wall 28 and the sixth cutout portion 26D formed in the front wall 26 are formed with substantially the same shape and substantially the same size as each other. However, there is no limitation thereto. For example, the fifth cutout portion 28D and the sixth cutout portion 26D may be formed with different shapes and different sizes to each other. The fifth cutout portion 28D and the sixth cutout portion 26D do not need to be formed at positions overlapping in back view.

Moreover, other weakened portions may be formed in place of, or in addition to, the fifth cutout portion 28D and the sixth cutout portion 26D. For example, through holes may be formed in the rear wall 28 and the front wall 26. A thinned portion where the thickness is thinner may also be formed.

In the third exemplary embodiment, the first reinforcement plate 62 and the second reinforcement plate 64 are provided. However, there is no limitation thereto, and there is no particular limitation to the number nor to the sizes of the reinforcement members. For example, even in a configuration in which the first reinforcement plate 62 is provided alone, the upper portion and the lower portion of the floor cross member 22 can be made to differ in strength.

A structure may be applied in which the floor cross member 22 at the vehicle right side and a floor cross member at the vehicle left side of the floor tunnel 14 are different to each other.

What is claimed is:

1. A vehicle lower section structure comprising:
   a pair of rockers that are respectively provided at each vehicle width direction end portion of a floor panel, and that extend along a vehicle front-rear direction;
   a floor tunnel that is provided running along the vehicle front-rear direction at a vehicle width direction intermediate section of the floor panel, and that opens toward a vehicle lower side; and
   a floor cross member that extends along the vehicle width direction and couples the rocker and the floor tunnel together, that includes an upper wall, a front wall extending downward from a front end portion of the upper wall, and a rear wall extending downward from a rear end portion of the upper wall that together with the floor panel configure a closed cross-section, wherein of the front wall and the rear wall, a first cutout portion is formed in a lower edge of an end portion at the rocker side of the wall further from a center pillar, and a second cutout portion that is smaller than the first cutout portion is formed in a lower edge of an end portion at the rocker side of the wall closer to the center pillar.

2. The vehicle lower section structure of claim 1, wherein the first cutout portion and the second cutout portion are formed further to a lower side than a position of half of a height of the floor cross member from the floor panel to an upper face of the upper wall.

3. The vehicle lower section structure of claim 1, wherein:
   the first cutout portion and the second cutout portion are formed with cutout heights along the vehicle up-down direction, which are equal; and
   a cutout width of the first cutout portion along the vehicle width direction is formed longer than a front-rear width of the upper wall along the vehicle front-rear direction, and a cutout width of the second cutout portion along the vehicle width direction is formed shorter than the front-rear width of the upper wall.

4. The vehicle lower section structure of claim 1, wherein, in addition to the first cutout portion and the second cutout portion, weakened portions are respectively formed in a lower portion of the front wall and a lower portion of the rear wall.

5. The vehicle lower section structure of claim 1, wherein a reinforcement member that reinforces a ridge line on an upper portion side of the floor cross member is provided at an upper portion of the floor cross member.

6. The vehicle lower section structure of claim 4, wherein the weakened portions are formed by additional cutout portions.

7. The vehicle lower section structure of claim 4, wherein the weakened portions are formed by through holes.

8. The vehicle lower section structure of claim 4, wherein the weakened portions are formed by thinned portions.

\* \* \* \* \*